United States Patent
Xu et al.

(10) Patent No.: US 11,218,926 B2
(45) Date of Patent: Jan. 4, 2022

(54) MASTER CELL GROUP FAILURE RECOVERY FOR DUAL CONNECTIVITY WIRELESS DEVICES

(71) Applicant: Apple Inc., Cupertino, CA (US)

(72) Inventors: Fangli Xu, Beijing (CN); Dawei Zhang, Saratoga, CA (US); Haijing Hu, Beijing (CN); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Longda Xing, San Jose, CA (US); Xu Ou, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 16/782,309

(22) Filed: Feb. 5, 2020

(65) Prior Publication Data

US 2020/0260347 A1 Aug. 13, 2020

(30) Foreign Application Priority Data

Feb. 13, 2019 (CN) .......................... 201910111959.5

(51) Int. Cl.
*H04W 4/00* (2018.01)
*H04W 36/00* (2009.01)
*H04W 36/30* (2009.01)
*H04W 48/16* (2009.01)
*H04W 88/06* (2009.01)

(52) U.S. Cl.
CPC .... *H04W 36/0079* (2018.08); *H04W 36/0069* (2018.08); *H04W 36/305* (2018.08); *H04W 48/16* (2013.01); *H04W 88/06* (2013.01)

(58) Field of Classification Search
CPC ......... H04W 36/0069; H04W 36/0079; H04W 36/305; H04W 48/16; H04W 76/18; H04W 88/06
See application file for complete search history.

(56) References Cited

U.S. PATENT DOCUMENTS

| | | | |
|---|---|---|---|
| 9,723,647 | B2 | 8/2017 | Yu et al. |
| 2018/0278357 | A1* | 9/2018 | Kim ..................... H04J 11/0076 |
| 2019/0045568 | A1 | 2/2019 | Palat et al. |
| 2019/0090144 | A1 | 3/2019 | Wu |

(Continued)

*Primary Examiner* — Matthew W Genack
(74) *Attorney, Agent, or Firm* — Kowert, Hood, Munyon, Rankin & Goetzel, P.C.

(57) ABSTRACT

Apparatuses, systems, and methods for a wireless device to perform master cell group failure recovery in a dual connectivity cellular communication system. The wireless device may establish a first wireless link to a cellular network via a first cell group. The first cell group may be configured as a master cell group for the wireless device. The wireless device may establish a second wireless link to the cellular network via a second cell group. The second cell group may be configured as a secondary cell group for the wireless device. The wireless device may determine that link failure for the first wireless link has occurred. The wireless device may perform master cell group link failure recovery using the second wireless link based at least in part on the link failure for the first wireless link.

20 Claims, 16 Drawing Sheets

(56) References Cited

U.S. PATENT DOCUMENTS

2019/0150217 A1   5/2019  Kim
2019/0182689 A1*  6/2019  Martin .................. H04W 24/04
2020/0059395 A1*  2/2020  Chen .................... H04W 76/19

* cited by examiner

MASTER CELL GROUP FAILURE RECOVERY FOR DUAL CONNECTIVITY WIRELESS DEVICES

PRIORITY DATA

This application claims benefit of priority to Chinese Application No. 201910111959.5, titled "Master Cell Group Failure Recovery for Dual Connectivity Wireless Devices", filed Feb. 13, 2019, which is hereby incorporated by reference in its entirety as though fully and completely set forth herein.

FIELD

The present application relates to wireless devices, and including to apparatuses, systems, and methods for a wireless device to perform master cell group failure recovery in a dual connectivity cellular communication system.

DESCRIPTION OF THE RELATED ART

Wireless communication systems are rapidly growing in usage. Further, wireless communication technology has evolved from voice-only communications to also include the transmission of data, such as Internet and multimedia content. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

In many instances, a wireless device may be able to communicate using multiple such technologies. However, determining how best to utilize multiple wireless communication technologies together in a wireless device in a complementary manner may be a complex task. Thus, improvements in the field are desired.

SUMMARY

Embodiments relate to apparatuses, systems, and methods for a wireless device to perform master cell group failure recovery in a dual connectivity cellular communication system.

The dual connectivity cellular communication system may support concurrent (or substantially concurrent) connections with multiple nodes of the same generation (e.g., fifth generation new radio (5G NR) network nodes) of cellular communication technology, or of different generations (e.g., 5G NR and LTE) of cellular communication technology, among various possibilities.

When a wireless device has dual connectivity, one cell group may be configured as a master cell group and another cell group may be configured as a secondary cell group, at least in some instances. In such a scenario, it may be possible for radio link failure to occur with either or both cell groups.

According to the techniques described herein, it may be possible to continue to use a link with one cell group while link failure is occurring with the other cell group, including potentially if link failure with the master cell group occurs. This may, for example, allow the wireless device to continue data communication and to recover the master cell group link using the secondary cell group link, thus potentially avoiding data interruptions and the need for a full radio resource control connection re-establishment procedure, in at least some instances.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
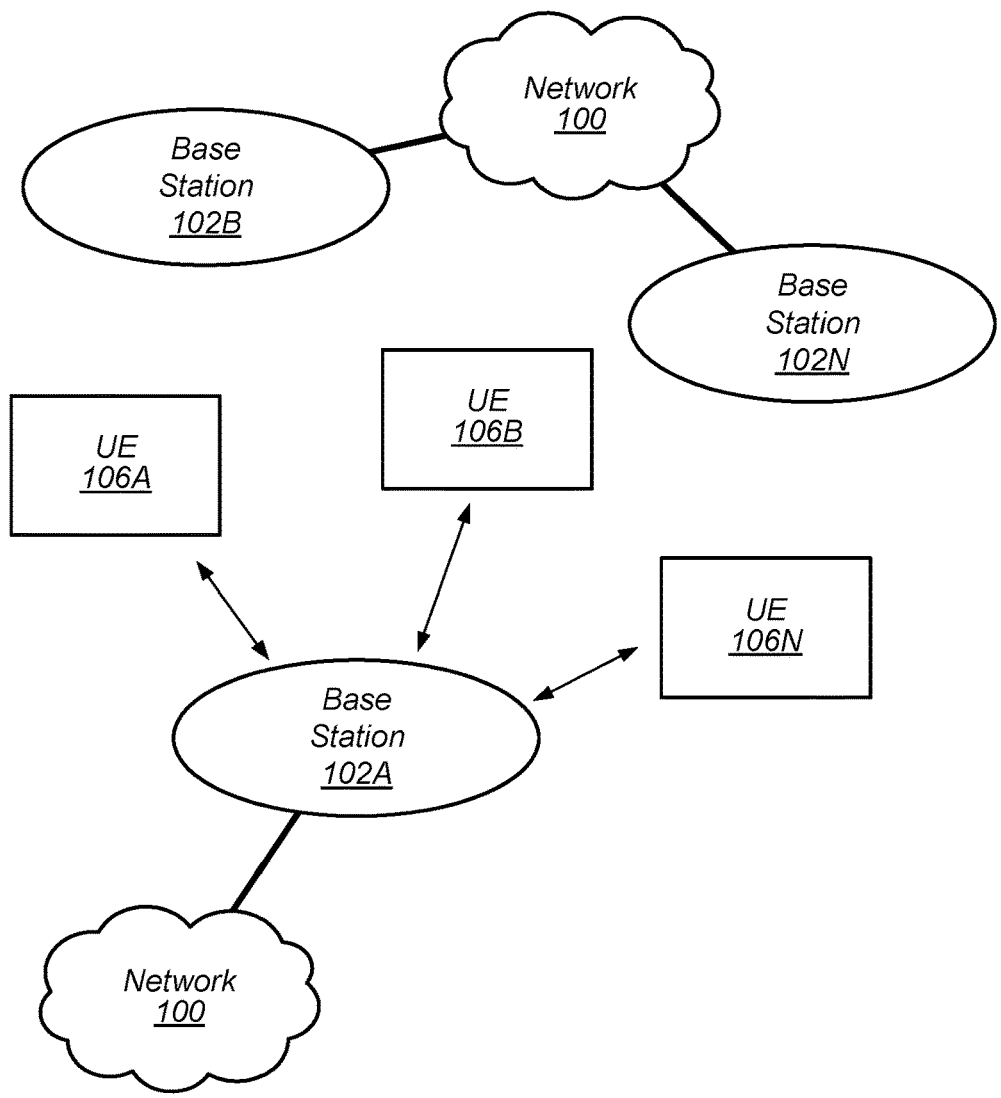
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
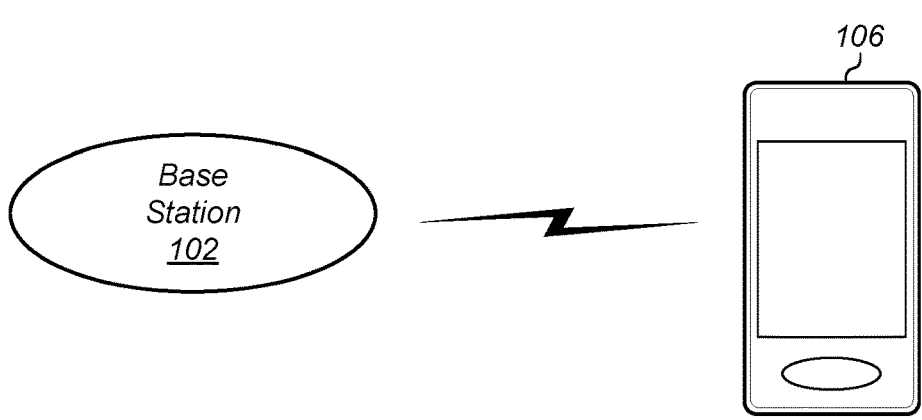
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. As another possibility, base station 102A may be a LTE base station, or "eNB". In some embodiments, a eNB may be connected to a legacy evolved packet core (EPC) network and/or to a NR core (NRC) network.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
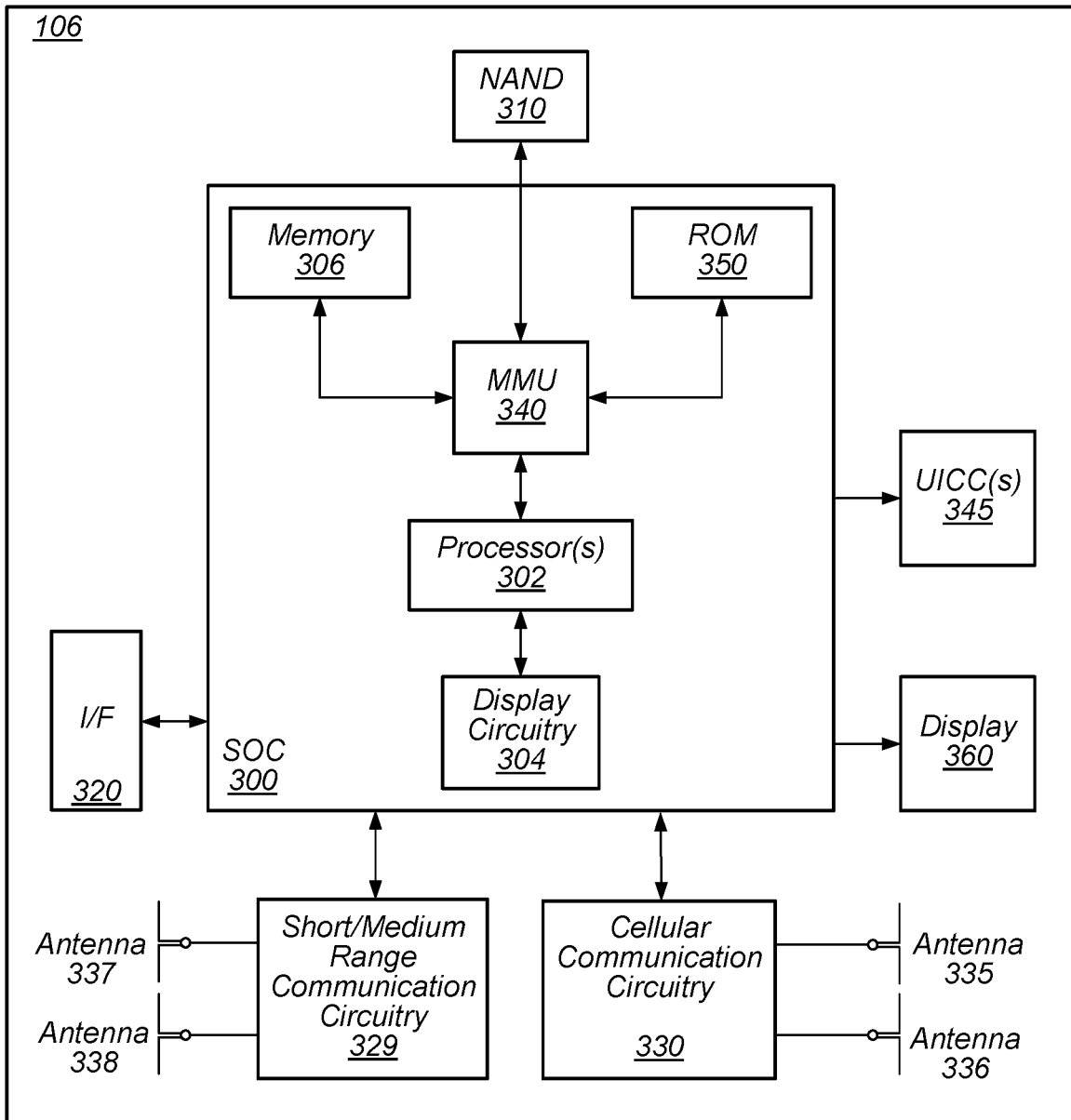
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT (or that also operates according to the first RAT). The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing features for performing master cell group failure recovery in a dual connectivity cellular communication system, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 335, 336, 337, 338, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
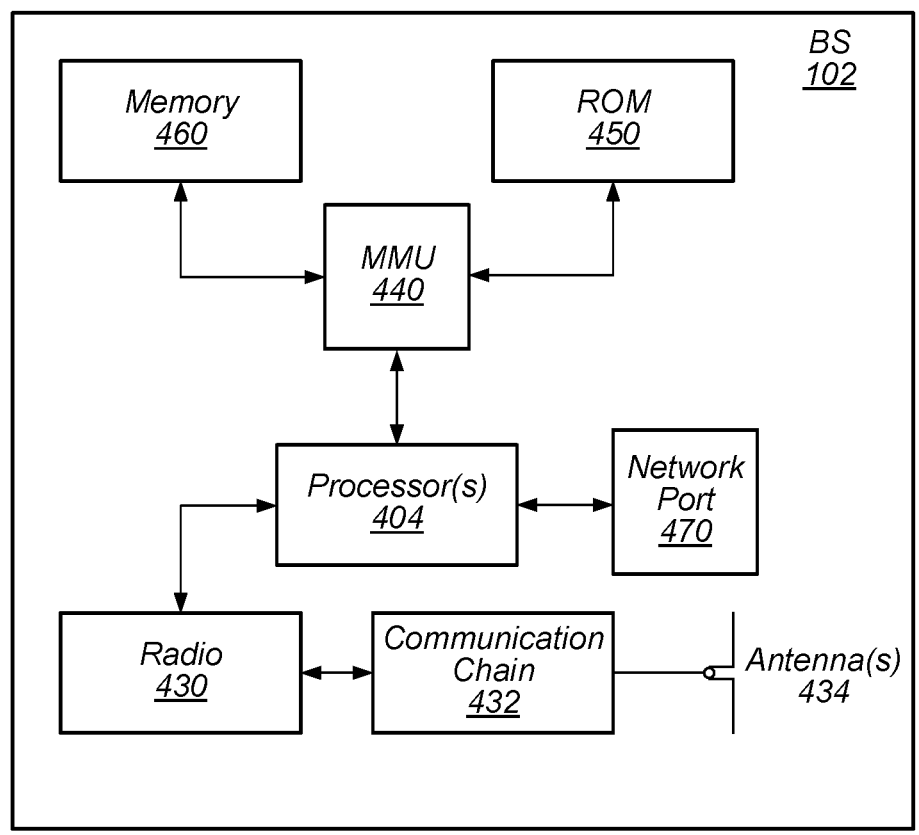
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
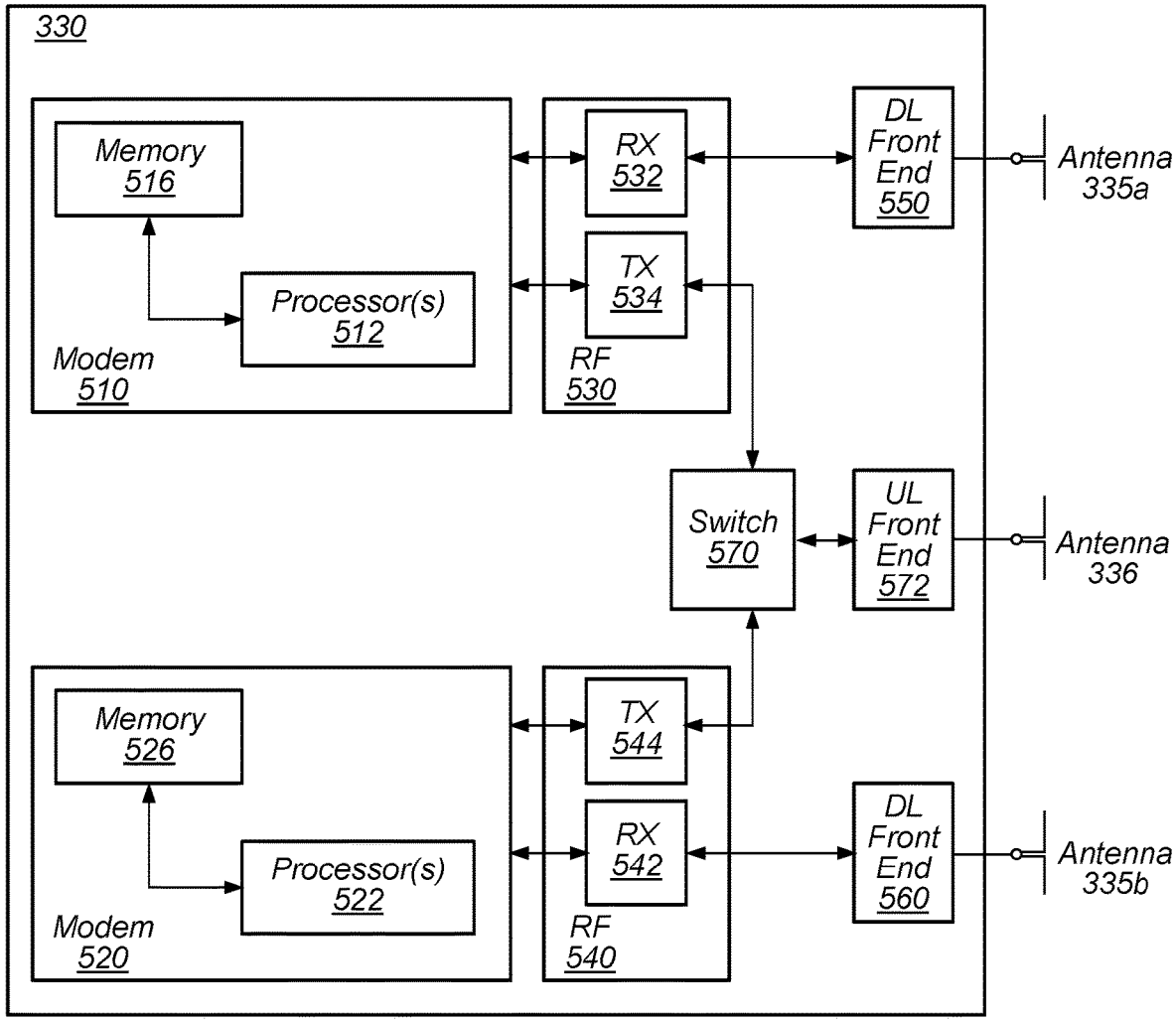
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to some embodiments, cellular communication circuitry 330 may be included in a communication device, such as communication device 106 described above herein. As noted above herein, communication device 106 may be a user equipment (UE) device, a mobile device or mobile station, a wireless device or wireless station, a desktop computer or computing device, a mobile computing device (e.g., a laptop, notebook, or portable computing device), a wearable device, a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to, e.g., communicatively; directly or indirectly), dedicated processors, and/or radios for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, such as LTE or LTE-A, and modem 520 may be configured for communications according to a second RAT, such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for performing master cell group failure recovery in a dual connectivity cellular communication system, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for performing master cell group failure recovery in a dual connectivity cellular communication system, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
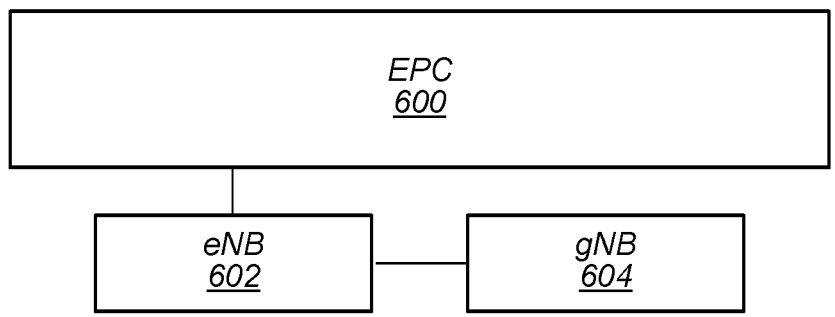
FIG. 6A illustrates an example of connections between an EPC network, an LTE base station (eNB), and a 5G NR base station (gNB), according to some embodiments.
Figure 6B:
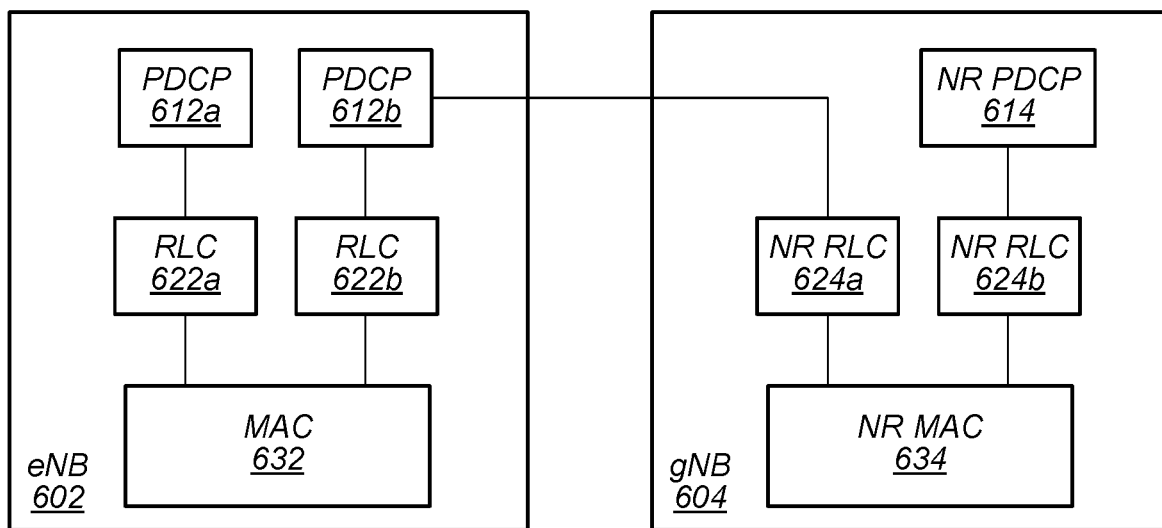
FIG. 6B illustrates an example of a protocol stack for an eNB and a gNB, according to some embodiments.

FIGS. 6A-6B—5G NR Non-standalone (NSA) Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an X2 interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Thus, FIGS. 6A-6B may represent aspects of one possible cellular communication system that implements dual connectivity. However, it should be noted that numerous other dual (or more generally multiple) connectivity configurations are also possible, and that features of this disclosure can be implemented any of a variety of such configurations. Some other examples could include a configuration in which a gNB can be configured as a master node and a eNB can be configured as a secondary node, or a configuration in which both a master node and a secondary node operate according to the same RAT (e.g., both operate according to NR, both operate according to LTE, etc.), among various other possible configurations.

Figure 7:
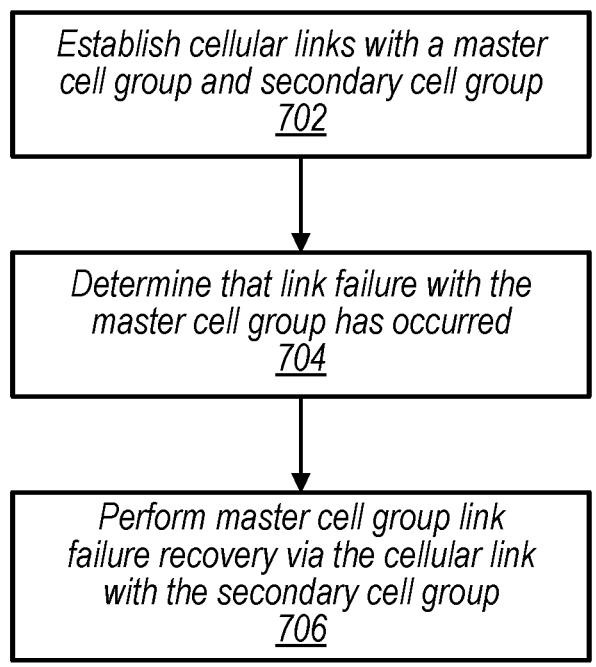
FIG. 7 is a flowchart diagram illustrating an example method for a wireless device to perform master cell group failure recovery in a dual connectivity cellular communication system, according to some embodiments.

FIG. 7—Master Cell Group Failure Recovery

FIG. 7 is a flowchart diagram illustrating an example method for a wireless device to perform master cell group failure recovery in a dual connectivity cellular communication system, according to some embodiments. Aspects of the method of FIG. 7 may be implemented by a wireless device such as a UE 106 illustrated in various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the method shown may be performed concurrently, in a different order than shown, may be substituted for by other method elements, or may be omitted. Additional elements may also be performed as desired. As shown, the method may operate as follows.

At 702, the wireless device may establish cellular links with a first cell group (which may be configured as a master cell group (MCG)) and a second cell group (which may be configured as a secondary cell group (SCG)), e.g., to obtain dual connectivity with a cellular network. This may include attaching to and establishing a radio resource control connection with a first base station that operates according to a first RAT, which may provide a first cell (or group of cells) operating in a first system bandwidth (e.g., including a first carrier frequency). This may further include attaching to and establishing a radio resource control connection with a second base station that operates according to the second RAT (or also operates according to the first RAT), which may provide a second cell (or group of cells) operating in a second system bandwidth (e.g., including a second carrier frequency), which may possibly be different than the first system bandwidth. Note that the first base station and the second base station may be different physical base stations or may be provided by the same physical base station and may differ only logically (e.g., a base station may be capable of providing cells according to both the first RAT and the second RAT).

In some embodiments, one of the RATs may be LTE and the other RAT may be NR; for example, the first RAT may be LTE and the second RAT may be NR, or the first RAT may be NR and the second RAT may be LTE. The order in which the cellular links are established may be arbitrary or may depend on any of various considerations, potentially including network architecture (e.g., if one of the base stations is intended for NSA operation and/or is a secondary base station), relative signal strength, relative priority level, etc. As one possibility, the wireless device may initially transmit signaling to an LTE base station, such as eNB 602 described previously herein, to establish an attachment to an LTE network. In other words, the wireless device may request a connection with the LTE base station. Similarly, in some instances, the wireless device may transmit signaling to a 5G NR base station, such as gNB 604 described previously herein, to establish an attachment to a 5G NR network. In other words, the wireless device may request a connection with the 5G NR base station.

Note that such an approach to establishing dual connectivity is one possibility among numerous other possible mechanisms and procedures for establishing dual connectivity with the MCG and the SCG. For example, as another possibility, as previously noted, it may also be possible that the MCG and the SCG operate according to the same RAT (e.g., both NR). Generally, the cellular links with the MCG and the SCG may be configured in accordance with any of various possible multi-RAT dual connectivity (MR-DC) configurations.

In 704, the wireless device may determine that it is experiencing MCG link failure (e.g., that link failure of the cellular link with the MCG has occurred). The MCG link failure may include any of various types of link failure. For example, the MCG link failure may be a radio link failure (RLF), which the wireless device may determine to have occurred based at least in part on any or all of a random access channel (RACH) procedure failure, a radio link control (RLC) failure, a radio link monitoring (RLM) failure, and/or any of various other causes.

In 706, the wireless device may perform MCG link failure recovery using the cellular link with the SCG. This may include suspending MCG transmission and reception and providing MCG link failure information to the cellular network using the cellular link with the SCG. The MCG link failure information can include any of various types of information. As one possibility, the MCG link failure information may include cause information for the MCG link failure. For example, as previously noted, the wireless device may have determined whether the MCG RLF occurred as a result of RACH failure, RLC failure, RLM failure, etc., and may provide such cause information as part of the MCG link failure information.

As another possibility, the MCG link failure information may include cell measurement information for the MCG and/or one or more other cells. For example, the wireless device may perform one or more serving cell and/or neighboring cell measurements based at least in part on determining that the wireless device is experiencing MCG link failure, and the MCG link failure information may include results of such cell measurements. Such information may assist the cellular network with determining how best to approach MCG link failure recovery.

At least according to some embodiments, the SCG may provide an indication that the wireless device is experiencing MCG link failure to the MCG. The indication may include the MCG link failure information provided by the wireless device. The indication may be provided in any of various manners, e.g., potentially depending on a signaling radio bearer (SRB) configuration of the wireless device, the MCG, and the SCG, and a SRB used by the wireless device to provide the indication that the wireless device is experiencing MCG link failure. For example, as one possibility, the wireless device may provide the indication that the wireless device is experiencing MCG link failure using a SRB that is split between the MCG and the SCG, and the SCG may also use the SRB that is split between the MCG and the SCG to forward the indication that the wireless device is experiencing MCG link failure. As another possibility, the wireless device may provide the indication that the wireless device is experiencing MCG link failure using a SRB that is specific to the wireless link between the wireless device and the SCG. In some instances, such an indication may be included as a container within a message provided using a format of the SRB that is specific to the wireless link between the wireless device and the SCG. In such a case, the SCG may use a SRB that is split between the MCG and the SCG to forward the indication that the wireless device is experiencing MCG link failure. As another possibility, the SCG may use an X2 message to forward the indication that the wireless device is experiencing MCG link failure.

The SCG may receive MCG reconfiguration information for the wireless device from the MCG, e.g., based on the MCG link failure information indicating that the wireless device is experiencing MCG link failure. The MCG reconfiguration information for the wireless device could include reconfiguration information modifying one or more of cell frequency, band, or resource configuration information (among various possibilities) for the primary cell of the wireless device, e.g., to potentially allow for the wireless device to recover the cellular link with the first cell group. For example, the MCG reconfiguration information could include an indication to perform handover to a different primary cell provided by the first cell group. As another possibility, the MCG reconfiguration information could include an indication to continue to use the current primary cell, but to use a different resource configuration. The SCG may provide such MCG reconfiguration information to the wireless device via the cellular link between the SCG and the wireless device, e.g., using the same signaling mechanism by which the MCG link failure information was received. The wireless device may accordingly receive the MCG reconfiguration information via the selected signaling mechanism on the cellular link between the wireless device and the SCG. In such a case, the wireless device may perform MCG reconfiguration in accordance with the MCG reconfiguration information and resume MCG transmission and reception with the first cell group continuing to act as MCG for the wireless device.

As another possibility, the MCG may determine to handover the primary cell (and thus MCG) of the wireless device to the second cell group, for example based on cell measurement information, network load considerations, and/or for any of various other reasons. In such a case, the second cell group may receive a request from the first cell group to handover MCG for the wireless device to the second cell group. The second cell group may respond to the first cell group with a confirmation to handover MCG for the wireless device to the second cell group. The second cell group may further determine MCG reconfiguration information (e.g., indicating to handover to a primary cell provided by the second cell group, among various possible information) for the wireless device, and provide the MCG reconfiguration information to the wireless device using the cellular link between the second cell group and the wireless device.

According to some embodiments, the wireless device may initiate a MCG recovery timer in conjunction with determining that the wireless device is experiencing MCG link failure and/or attempting to perform MCG link failure recover via the SCG. For example, it may be preferable to limit the amount of time that the wireless device spends attempting to perform MCG link failure recovery via the SCG, in case such MCG link failure recovery efforts are unsuccessful, before attempting an alternative approach MCG link failure recovery. Thus, the MCG recovery timer may be initiated upon transmitting the MCG link failure information to the SCG, or possibly alternatively upon determining that link failure with the MCG has occurred. In such a case, if MCG link failure recovery has not yet succeeded when the MCG recovery timer expires, the wireless device may stop performing MCG link failure recovery via the SCG. The wireless device may, for example, initiate a radio resource control re-establishment procedure if the MCG recovery timer expires. Note additionally that if the wireless device also experiences SCG link failure while experiencing MCG link failure, the wireless device may similarly stop performing MCG link failure recovery via the SCG and may initiate a radio resource control re-establishment procedure.

Note that while such MCG link failure recovery is being performed, the wireless device and the cellular network may be able to continue to perform uplink and/or downlink data transmissions, e.g., via the cellular link between the wireless device and the SCG. In other words, using the techniques described herein for MCG link failure recovery using a SCG, it may be possible to continue data activity without interruption when MCG link failure occurs, at least in some instances.

Note that while the techniques for performing master cell group failure recovery in a dual connectivity cellular communication system described with respect to FIG. 7 are described primarily in conjunction with activities by a wireless device, similar techniques may be used, e.g., by a cellular base station, to handle or facilitate such failure recovery on the network side, if desired.

FIGS. 8-19 and Additional Information

FIGS. 8-19 and the following additional information are provided by way of example of various considerations and details relating to possible systems in which the method of FIG. 7 and/or other aspects of this disclosure may be implemented, and are not intended to be limiting to the disclosure as a whole. Numerous variations and alternatives to the details provided herein below are possible and should be considered within the scope of the disclosure.

Figure 8:
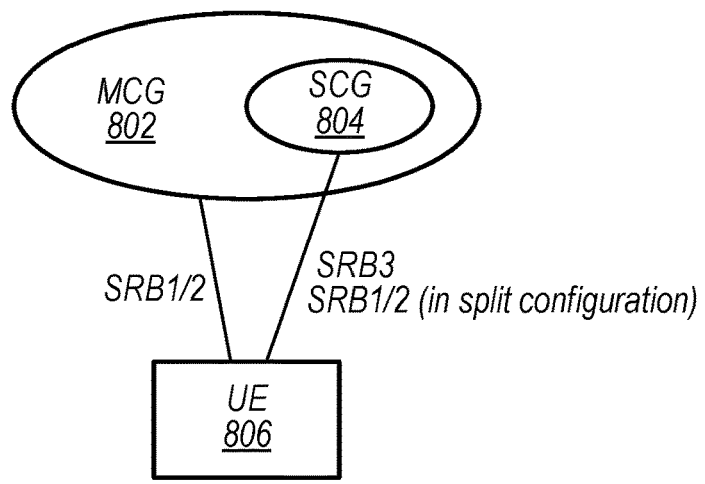
FIG. 8 illustrates exemplary aspects of a dual connectivity cellular communication system, according to some embodiments.

FIG. 8 illustrates aspects of an exemplary possible dual connectivity cellular communication system. As shown, a UE 806 may be in communication with a master cell group 802 and a secondary cell group 804. As shown, possible signaling radio bearers for the communication system could include SRB1 and SRB2, which may be used to communicate with the MCG, and possibly also with the SCG in a split bearer configuration. The possible signaling radio bearers for the communication system could also or alternatively include SRB3, which may be a SCG specific SRB.

Figure 9:
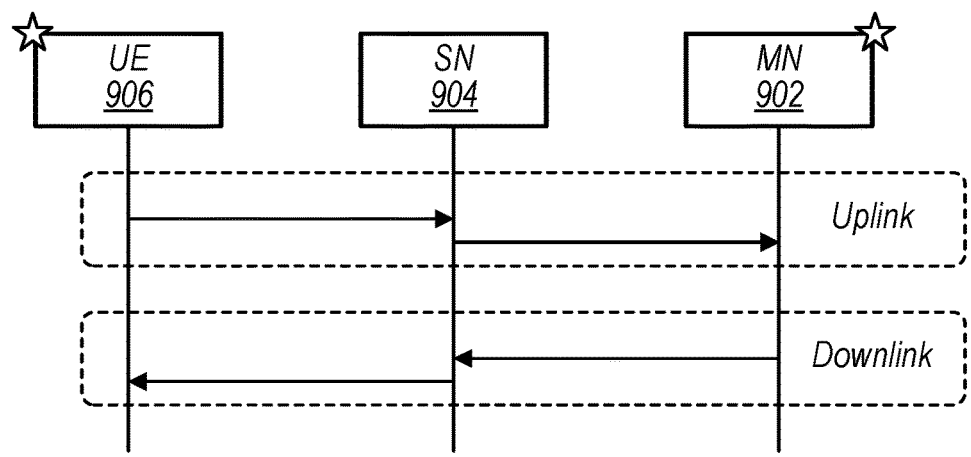
FIGS. 9-10 illustrate exemplary aspects of possible signaling radio bearer configurations for a dual connectivity cellular communication system, according to some embodiments.

FIG. 9 is a signal flow diagram illustrating an exemplary scenario in which a split SRB configuration is used. As shown, a UE 906 may perform uplink and downlink signaling via a split SRB with a secondary node (SN) 904 and a master node (MN) 902. The split SRB configuration may be applicable to MCG SRBs (e.g., MCG SRB1/MCG SRB2). For such SRBs, transmission can be via the MCG or the SCG. In the network, the MN 902 may be used for RRC message encoding/decoding.

Figure 10:
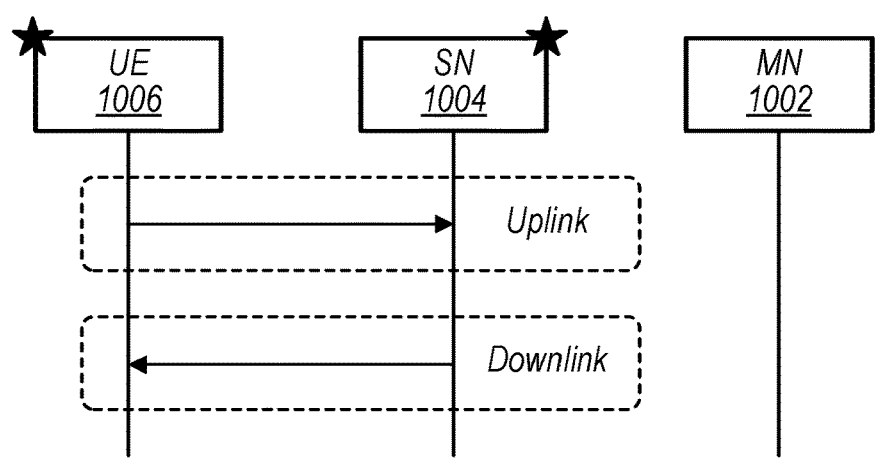

FIG. 10 is a signal flow diagram illustrating an exemplary scenario in which a SCG specific SRB configuration is used. As shown, a UE 1006 may perform uplink and downlink signaling with a SN 1004, and may separately be in communication with a MN 1002 (not shown). The SCG SRB (e.g., SCG SRB3) may be used to provide SN RRC reconfiguration messages, SN RRC reconfiguration complete messages, SN measurement report messages, and/or other RRC messages. For such a SRB, transmission may be performed via SCG (e.g., only). In the network, the SN 1004 may be used for RRC message encoding/decoding.

Figure 11:
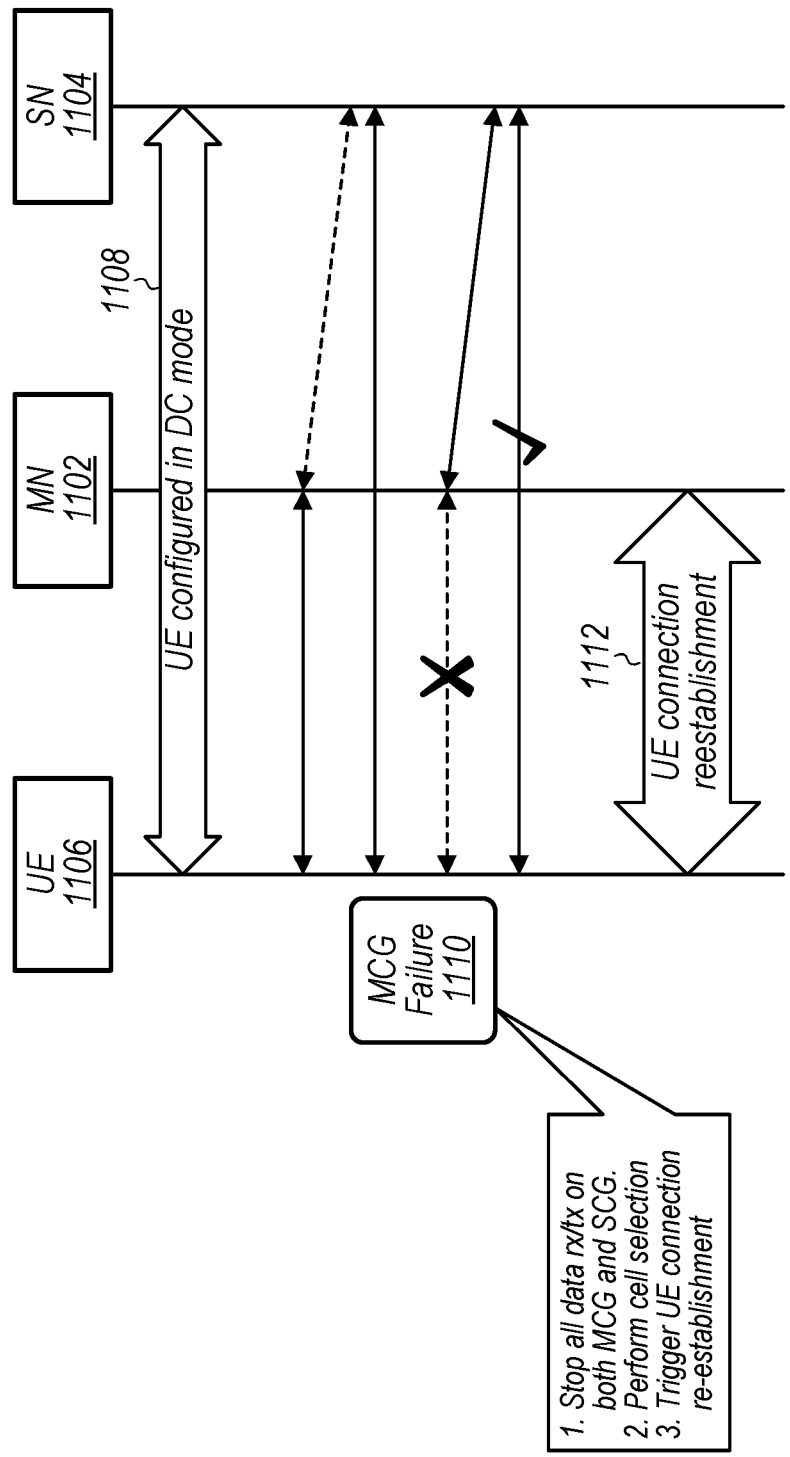
FIGS. 11-19 are signal flow diagrams illustrating exemplary aspects of a variety of possible master cell group link recovery scenarios, according to some embodiments.

At least according to some embodiments, RLF may be declared separately for the MCG and for the SCG in such a dual connectivity cellular communication system. As one possible approach to handling RLF on the MCG, a UE may initiate a RRC connection re-establishment procedure. FIG. 11 illustrates aspects of such an exemplary approach. As shown, in 1108, a UE 1106 may be configured in dual connectivity mode with a MN 1102 and a SN 1104. Thus, the UE 1106 may be able to communicate with the MN 1102, and the SN 1104, and the MN 1102 and the SN 1104 may communicate with each other (e.g., via an X2 interface, or in another manner). In 1110, the UE 1106 may detect MCG failure, as RLF may be declared with the MN 1102, although the wireless link between the UE 1106 and the SN 1104, as well as the link between MN 1102 and SN 1104, may remain connected. Based on the MCG failure, the UE 1106 may stop all data reception and transmission on both the MCG and the SCG, select a new candidate serving cell, and trigger UE connection re-establishment. In 1112, the UE 1106 may then perform UE connection re-establishment (e.g., with the MN 1102, or with whatever node provides the selected candidate serving cell).

However, if there is no problem with the SCG, it may alternatively be possible to recover the MCG problem via the SCG, potentially avoiding interruption of data communication (e.g., since data communication with the SCG can continue even while the MCG failure is occurring). Further, it may also potentially be possible to avoid UE connection re-establishment handling by recovering the MCG problem via the SCG, which may potentially reduce UE power consumption and/or reduce network signaling burden, among various possible benefits.

Thus, according to such an approach, if only MCG failure is detected (e.g., if the SCG link still works), a UE may initiate a MCG failure recovery procedure via a SCG path. The MCG failure recovery procedure may include suspending MCG transmission/reception, and possibly (e.g., optionally) performing one or more cell measurements on the MCG serving cell. The UE may transmit MCG failure information to the network via the SN providing the SCG, and the SN may forward the information to the MN providing the MCG. The MCG failure information could include failure cause information, any serving cell measurement results, and/or any additional (e.g., neighbor/alternative cell measurement results. The MCG failure information could be transmitted on a split SRB (e.g., the SCG leg of a split SRB1), or on a SCG specific SRB (e.g., SRB3).

Based on the MCG failure information, the MN may adjust the MCG configuration (e.g., may determine MCG reconfiguration information, which may or may not include a primary cell (PCell) change), and transmit RRC reconfiguration information with the adjusted MCG configuration to the UE via the SCG path.

Upon receiving the first reconfiguration after MCG failure detection, the UE may apply the configuration, resume the MCG transmission/reception, and may send a RRC reconfiguration complete message to the network, e.g., via the target PCell. If the first reconfiguration complete transmission is successful, the MCG failure may be successfully recovered.

As previously noted herein, it may be the case that data transmission on the SCG is not impacted during such a MCG recovery procedure, at least according to some embodiments.

The UE may also initiate a MCG recovery timer in conjunction with the MCG failure recovery procedure via the SCG path. For example, such a timer may be initiated when the UE transmits the MCG failure information to the network. If the MCG failure recovery via the SCG path is successful, the MCG recovery timer may be stopped. However, if the MCG recovery timer expires (e.g., and the MCG failure is still occurring), the UE may stop all transmissions and initiate UE connection re-establishment. Similarly, if SCG failure is detected after the MCG failure recovery procedure via the SCG path is initiated, or if SCG failure is detected together with MCG failure, the UE may also initiate an RRC connection re-establishment procedure.

Figure 12:
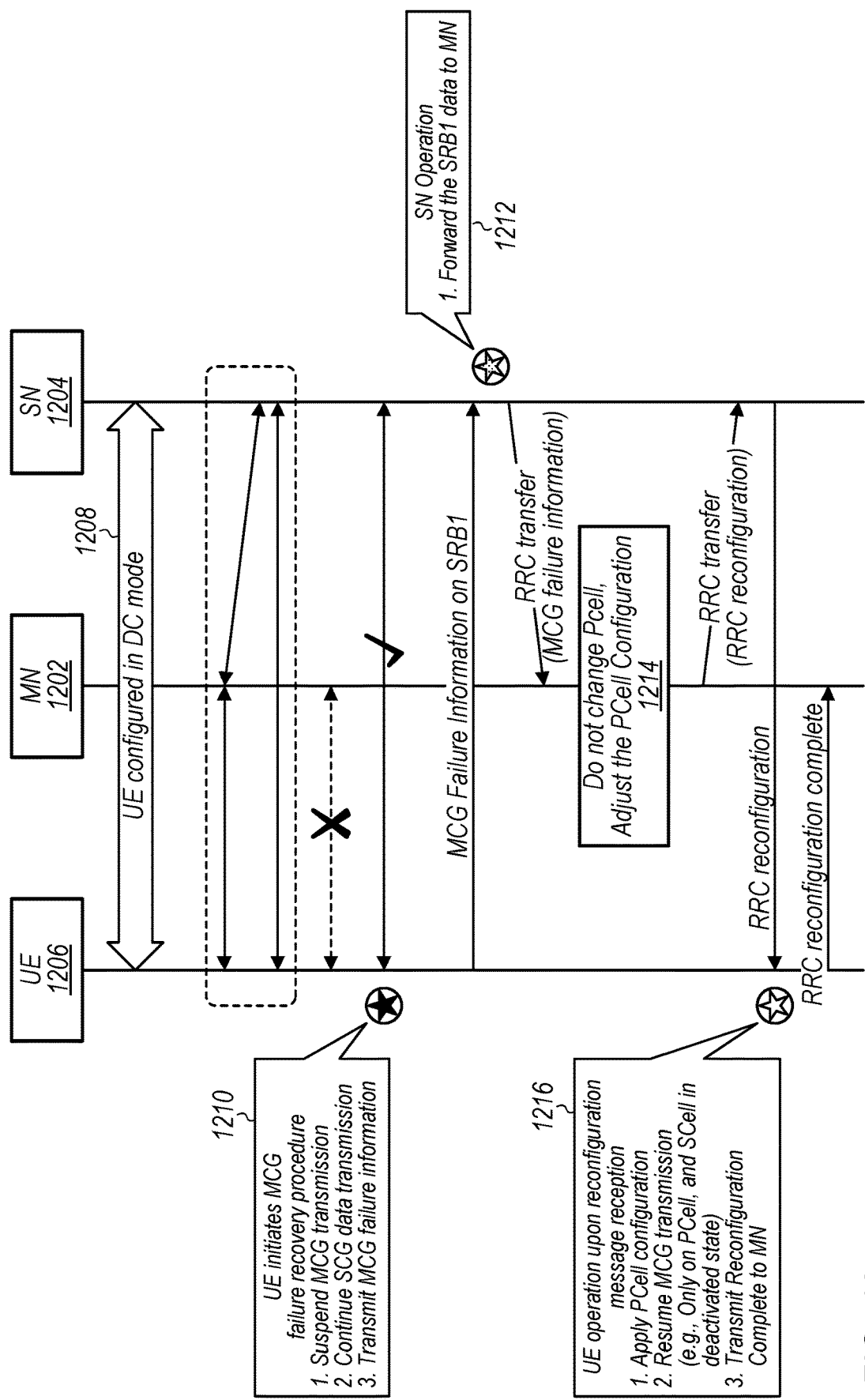

FIGS. 12-19 are signal flow diagrams illustrating various possible scenarios in which such a MCG failure recovery procedure may be attempted via a SCG path. FIG. 12 illustrates a scenario in which MCG failure recovery is performed via a split SRB (e.g., SRB1). As shown, in 1208, a UE 1206, MN 1202, and SN 1204 may be configured to communicate in dual connectivity mode. In 1210, the UE 1206 may determine that MCG link failure has occurred, but that the SCG link remains connected, and may initiate a MCG failure recovery procedure, including suspending MCG transmission, continuing SCG data transmission, and transmitting MCG failure information on the SRB1. In 1212, the SN 1204 may receive the MCG failure information via the SRB1, and may forward the SRB1 data (e.g., including the MCG failure information) to the MN 1202. In 1214, based on the MCG failure information, the MN 1202 may determine not to change the PCell for the UE 1206, but to adjust the PCell configuration for the UE 1206. The MN 1202 may provide RRC reconfiguration information indicating this adjustment to the SN 1204, which may in turn provide the RRC reconfiguration information to the UE 1206, e.g., using the SCG leg of the SRB1. In 1216, the UE 1206 may receive the RRC reconfiguration message, and may apply the indicated PCell configuration, resume MCG transmission (possibly only on the PCell, with the Scell in a deactivated state), and transmit a RRC reconfiguration complete message to the MN 1202.

Figure 13:
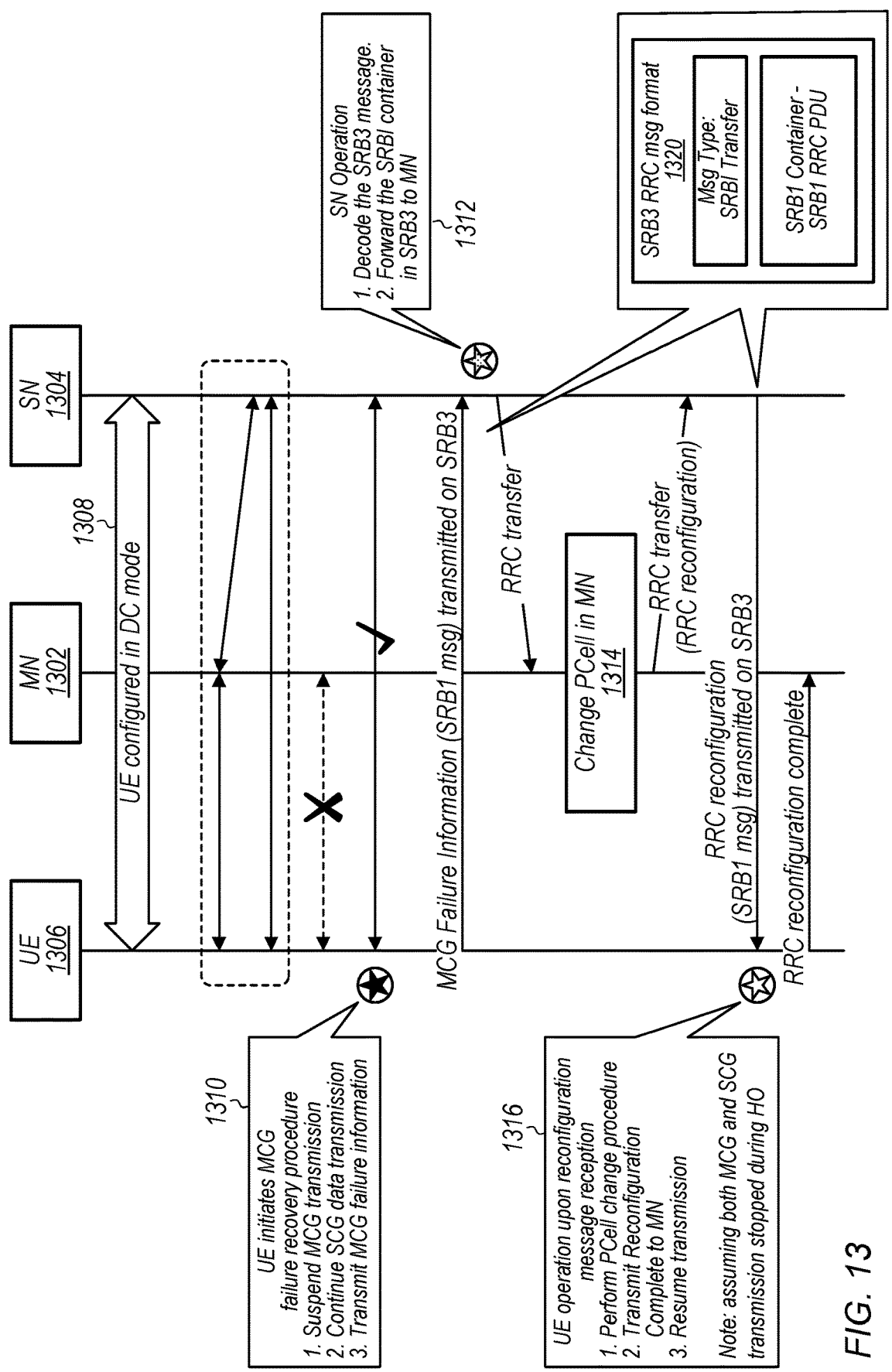

FIG. 13 illustrates a scenario in which MCG failure recovery is performed via a SCG specific SRB (e.g., SRB3). As shown, in 1308, a UE 1306, MN 1302, and SN 1304 may be configured to communicate in dual connectivity mode. In 1310, the UE 1306 may determine that MCG link failure has occurred, but that the SCG link remains connected, and may initiate a MCG failure recovery procedure, including suspending MCG transmission, continuing SCG data transmission, and transmitting MCG failure information on the SRB3. The MCG failure information may be transmitted using a RRC message format 1320 that includes a SRB1 container within the SRB3 RRC message, as shown. In 1312, the SN 1304 may receive the MCG failure information via the SRB3, and may forward the SRB1 container (e.g., including the MCG failure information) to the MN 1302. In 1314, based on the MCG failure information, the MN 1302 may determine to change the PCell for the UE 1306, but keep the PCell with the MN 1302. The MN 1302 may provide RRC reconfiguration information indicating this adjustment to the SN 1304, which may in turn provide the RRC reconfiguration information to the UE 1306, e.g., using a similar SRB1 container for the RRC reconfiguration information within a SRB3 RRC message. In 1316, the UE 1306 may receive the RRC reconfiguration message, and may apply the indicated PCell configuration, transmit a RRC reconfiguration complete message to the MN 1302, and resume MCG transmission. Note that it may be the case that both MCG and SCG transmission is stopped during the handover to the new PCell.

Figure 14:
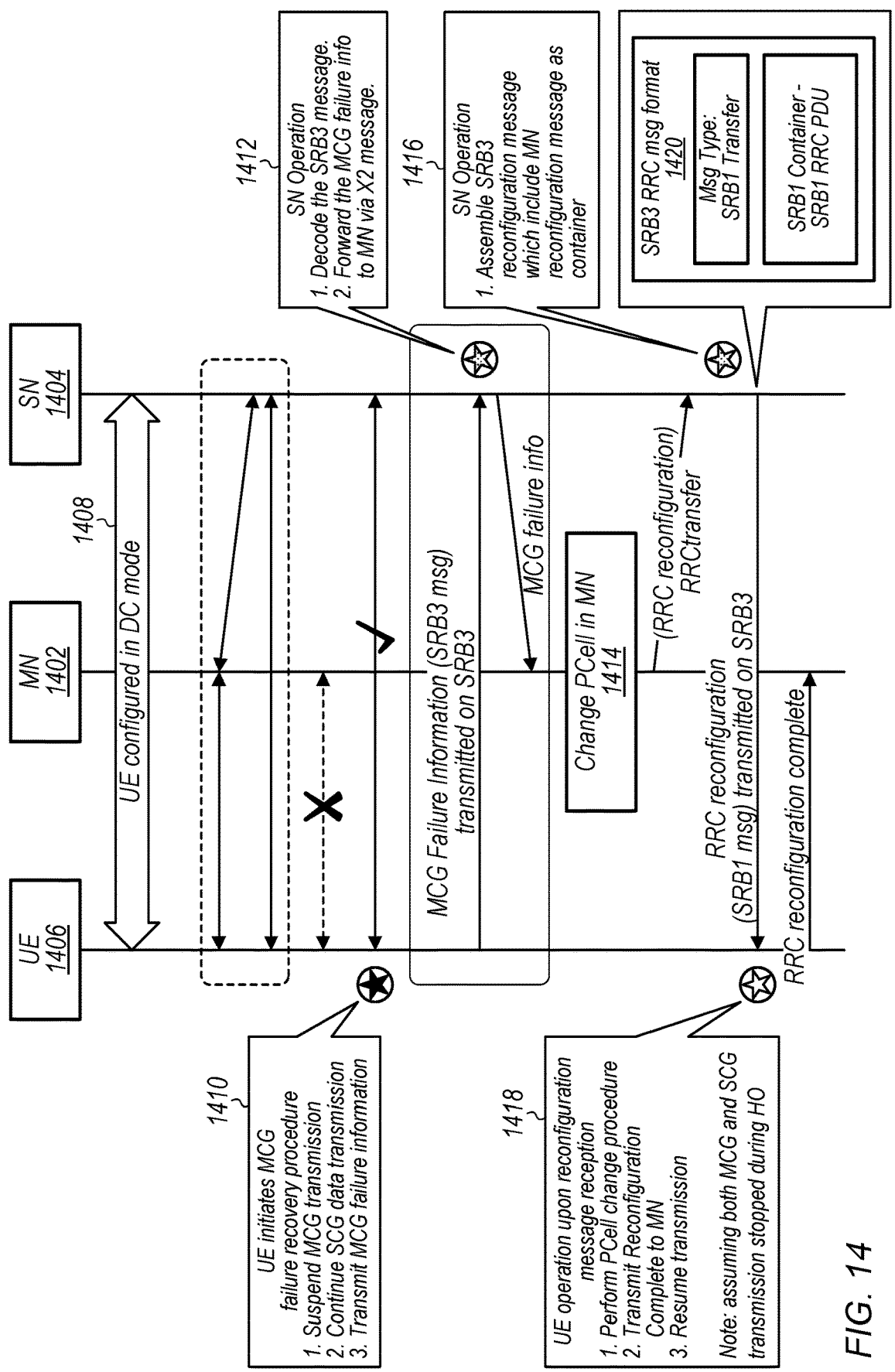

FIG. 14 illustrates an alternate scenario in which MCG failure recovery is performed via a SCG specific SRB (e.g., SRB3). As shown, in 1408, a UE 1406, MN 1402, and SN 1404 may be configured to communicate in dual connectivity mode. In 1410, the UE 1406 may determine that MCG link failure has occurred, but that the SCG link remains connected, and may initiate a MCG failure recovery procedure, including suspending MCG transmission, continuing SCG data transmission, and transmitting MCG failure information on the SRB3. The MCG failure information may be transmitted using a RRC message format 1420 that includes a SRB1 container within the SRB3 RRC message, as shown. In 1412, the SN 1404 may receive the MCG failure information via the SRB3, and may forward the MCG failure information included in the SRB1 container to the MN 1402 via X2 message. In 1414, based on the MCG failure information, the MN 1402 may determine to change the PCell for the UE 1406, but keep the PCell with the MN 1402. The MN 1402 may provide RRC reconfiguration information indicating this adjustment to the SN 1404 (e.g., again via X2 message). In 1416, the SN 1404 may assemble a SRB3 reconfiguration message, which may include the RRC reconfiguration information in a SRB1 container, and may provide the SRB3 reconfiguration message to the UE 1406. In 1418, the UE 1406 may receive the RRC reconfiguration message, and may apply the indicated PCell configuration, transmit a RRC reconfiguration complete message to the MN 1402, and resume MCG transmission. Note that it may be the case that both MCG and SCG transmission is stopped during the handover to the new PCell.

Figure 15:
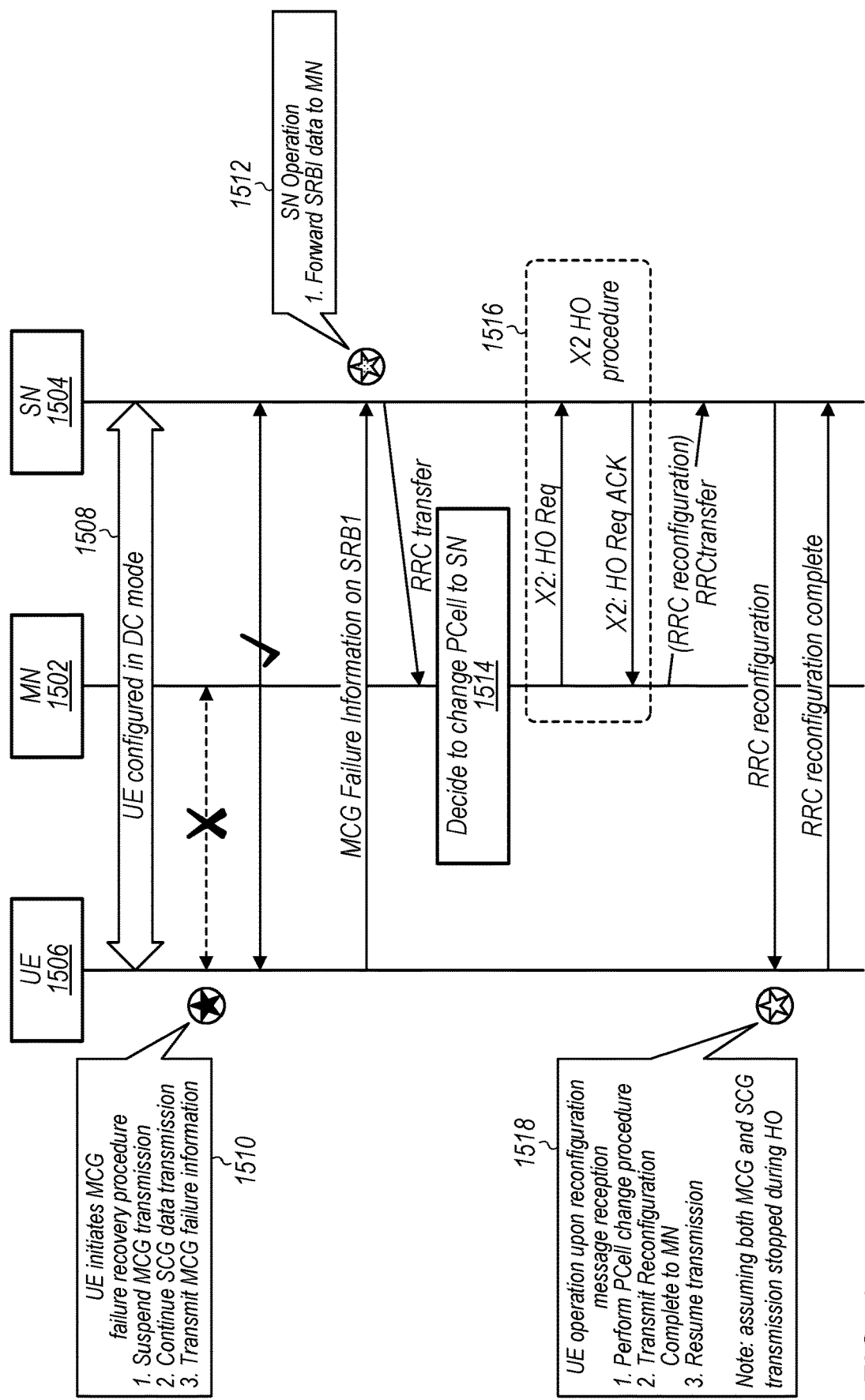

FIG. 15 illustrates another possible scenario in which MCG failure recovery is performed via a split SRB (e.g., SRB1). As shown, in 1508, a UE 1506, MN 1502, and SN 1504 may be configured to communicate in dual connectivity mode. In 1510, the UE 1506 may determine that MCG link failure has occurred, but that the SCG link remains connected, and may initiate a MCG failure recovery procedure, including suspending MCG transmission, continuing SCG data transmission, and transmitting MCG failure information on the SRB1. In 1512, the SN 1504 may receive the MCG failure information via the SRB1, and may forward the SRB1 data (e.g., including the MCG failure information) to the MN 1502. In 1514, based on the MCG failure information, the MN 1502 may determine to handover the PCell for the UE 1506 to the SN 1504. The MN 1502 and the SN 1504 may perform a handover procedure 1516, including the MN 1502 providing a handover request to the SN 1504 via the X2 interface, and the SN 1504 providing a handover request acknowledgement to the MN 1502 via the X2 interface. The MN 1502 may provide RRC reconfiguration information for this RRC transfer to the SN 1504, which may in turn provide the RRC reconfiguration information to the UE 1506, e.g., using the SRB1. In 1518, the UE 1506 may receive the RRC reconfiguration message, and may apply the indicated PCell configuration, transmit a RRC reconfiguration complete message to the SN 1504 (which may now become the master node with respect to the UE 1506), and resume MCG transmission. Note that it may be the case that both MCG and SCG transmission is stopped during the handover to the new PCell.

Figure 16:
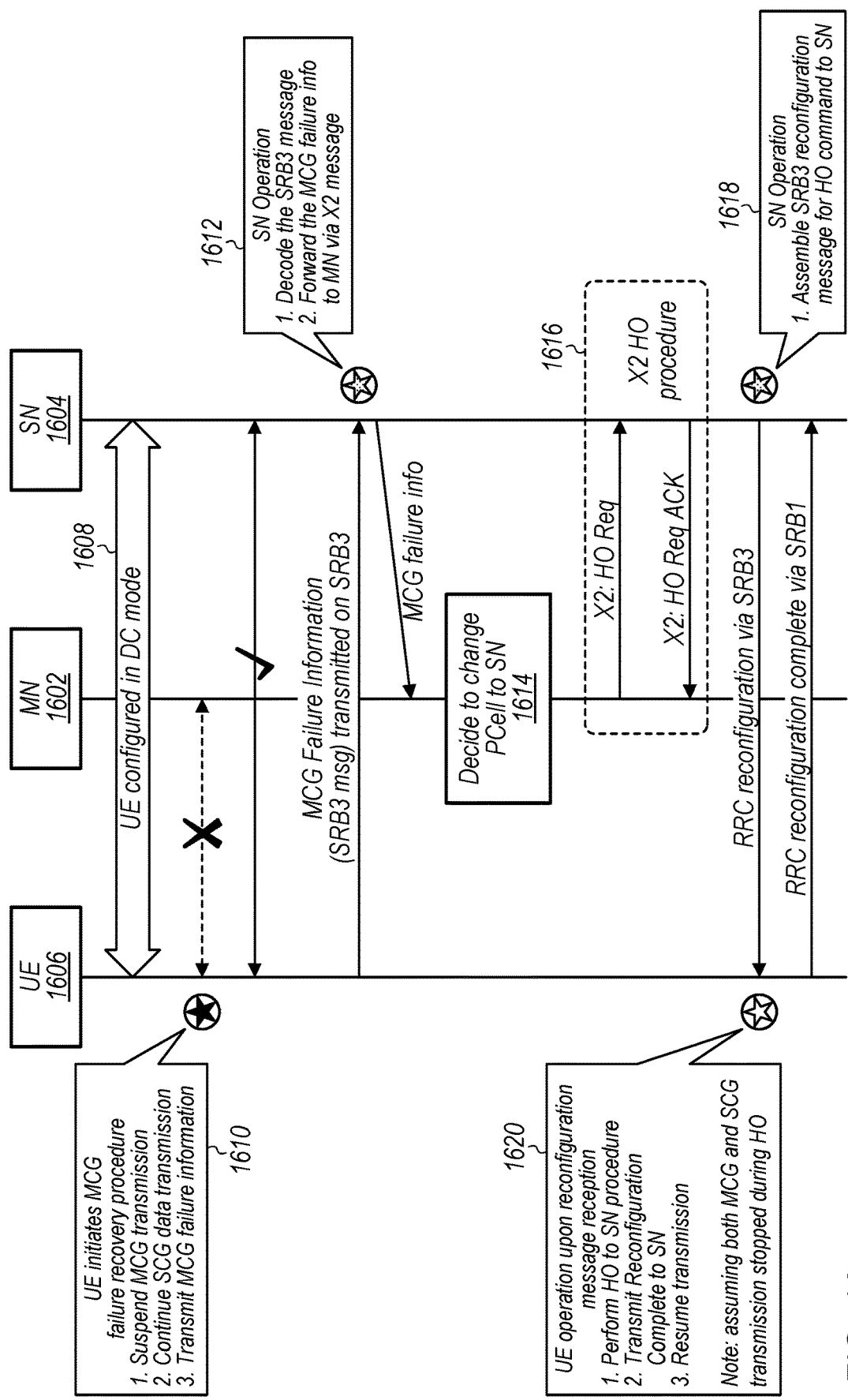

FIG. 16 illustrates another possible scenario in which MCG failure recovery is performed via a SCG specific SRB (e.g., SRB3). As shown, in 1608, a UE 1606, MN 1602, and SN 1604 may be configured to communicate in dual connectivity mode. In 1610, the UE 1606 may determine that MCG link failure has occurred, but that the SCG link remains connected, and may initiate a MCG failure recovery procedure, including suspending MCG transmission, continuing SCG data transmission, and transmitting MCG failure information on the SRB3. In 1612, the SN 1604 may receive the MCG failure information via the SRB3, and may forward the MCG failure information to the MN 1602 via X2 message. In 1614, based on the MCG failure information, the MN 1602 may determine to handover the PCell for the UE 1606 to the SN 1604. The MN 1602 and the SN 1604 may perform a handover procedure 1616, including the MN 1602 providing a handover request to the SN 1604 via the X2 interface, and the SN 1604 providing a handover request acknowledgement to the MN 1602 via the X2 interface. In 1618, the SN 1604 may assemble a SRB3 reconfiguration message for providing a command to the UE 1606 indicating to handover to the SN 1604, and may provide the RRC reconfiguration information to the UE 1606, e.g., using the SRB3. In 1620, the UE 1606 may receive the RRC reconfiguration message, and may apply the indicated PCell configuration, transmit a RRC reconfiguration complete message to the SN 1604 (which may now become the master node with respect to the UE 1606), e.g., using the SRB1, and resume MCG transmission. Note that it may be the case that both MCG and SCG transmission is stopped during the handover to the new PCell.

Figure 17:
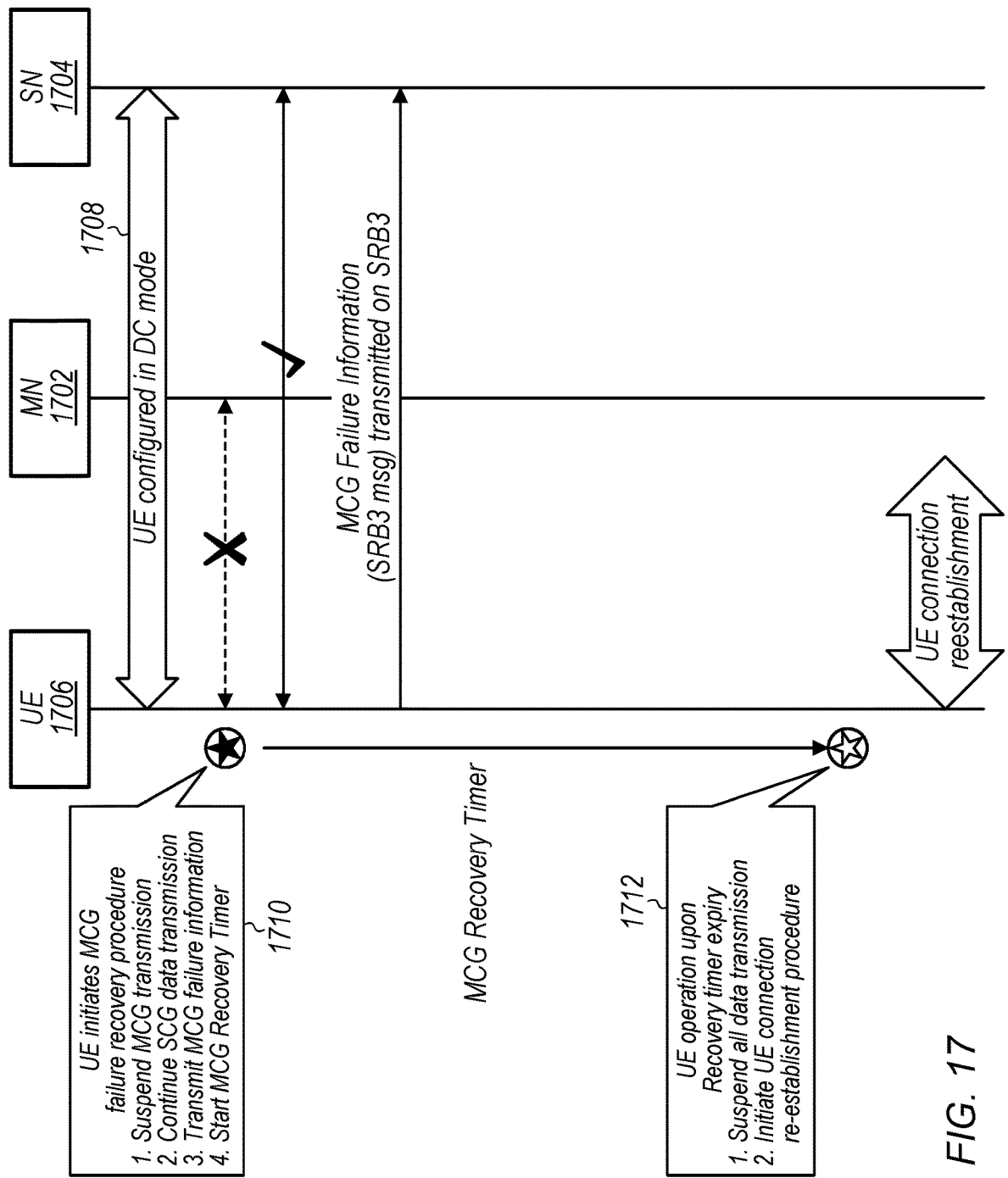

FIG. 17 illustrates aspects of possible use of a MCG recovery timer in conjunction with attempted MCG failure recovery via the SCG. As shown, in 1708, a UE 1706, MN 1702, and SN 1704 may be configured to communicate in dual connectivity mode. In 1710, the UE 1706 may determine that MCG link failure has occurred, but that the SCG link remains connected, and may initiate a MCG failure recovery procedure, including suspending MCG transmission, continuing SCG data transmission, and transmitting MCG failure information on the SRB3. Additionally, the UE 1706 may start a MCG recovery timer when the MCG failure information is transmitted. In 1712, the UE may determine that the MCG recovery timer has expired, without successful MCG recovery, and may suspend all data transmission, and initiate a UE connection re-establishment procedure.

Figure 18:
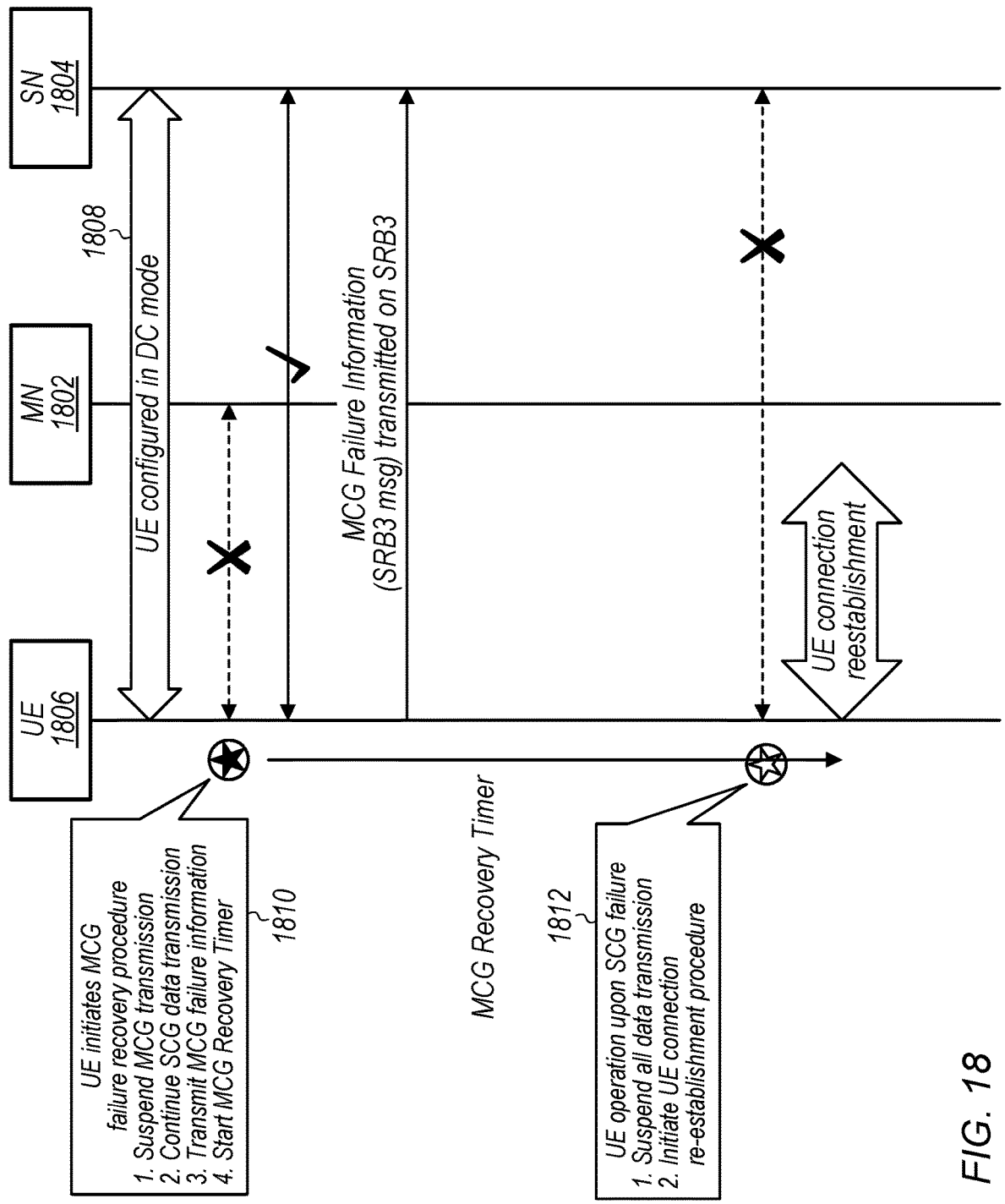

FIG. 18 illustrates further aspects of possible use of a MCG recovery timer in conjunction with attempted MCG failure recovery via the SCG. As shown, in 1808, a UE 1806, MN 1802, and SN 1804 may be configured to communicate in dual connectivity mode. In 1810, the UE 1806 may determine that MCG link failure has occurred, but that the SCG link remains connected, and may initiate a MCG failure recovery procedure, including suspending MCG transmission, continuing SCG data transmission, and transmitting MCG failure information on the SRB3. Additionally, the UE 1806 may start a MCG recovery timer when the MCG failure information is transmitted. In 1812, the UE may determine that SCG link failure has also occurred, and may suspend all data transmission, and initiate a UE connection re-establishment procedure (e.g., although the MCG recovery timer may not yet have expired).

Figure 19:
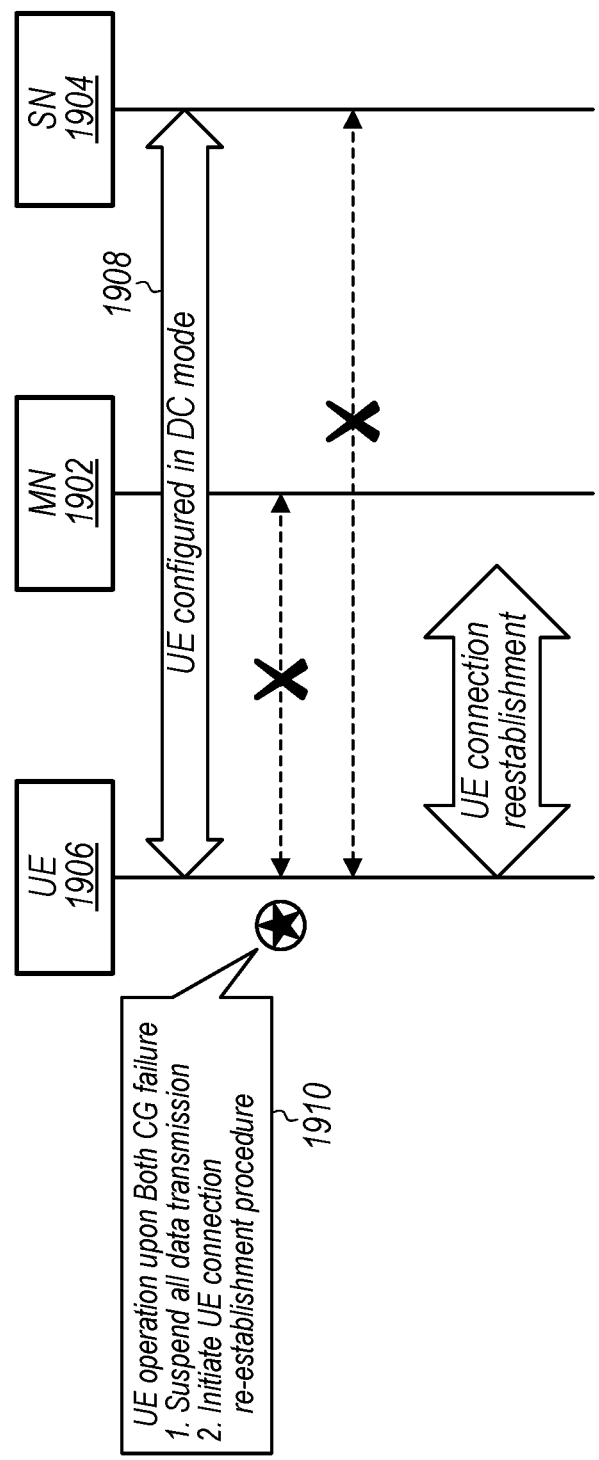

FIG. 19 illustrates aspects of a possible scenario in which both MCG failure and SCG failure are detected. As shown, in 1908, a UE 1906, MN 1902, and SN 1904 may be configured to communicate in dual connectivity mode. In 1910, the UE 1906 may determine that MCG link failure has occurred, and that SCG link failure has also occurred. Based on the MCG link failure and the SCG link failure, the UE 1906 may suspend all data transmissions, and may initiate a UE connection re-establishment procedure.

Thus, by using such techniques as described herein for performing MCG recovery via the SCG, it may be possible to reduce or avoid data communication interruptions that might otherwise occur during MCG link failures, at least according to some embodiments.

In the following further exemplary embodiments are provided.

One set of embodiments may include an apparatus, comprising: a processing element configured to cause a wireless device to: establish a first wireless link to a cellular network via a first cell group, wherein the first cell group is configured as a master cell group (MCG); establish a second wireless link to the cellular network via a second cell group, wherein the second cell group is configured as a secondary cell group (SCG); determine that link failure for the first wireless link has occurred; and perform MCG link failure recovery using the second wireless link based at least in part on the link failure for the first wireless link.

According to some embodiments, to perform MCG link failure recovery via the second wireless link, the processing element is further configured to cause the wireless device to: suspend MCG transmission and reception; transmit MCG link failure information to the cellular network using the second wireless link; receive MCG reconfiguration information from the cellular network using the second wireless link; and resume MCG transmission and reception using the MCG reconfiguration information.

According to some embodiments, the MCG link failure information includes cause information for the link failure for the first wireless link.

According to some embodiments, the MCG link failure information includes measurement information for one or more of the first cell group or one or more neighbor cells.

According to some embodiments, the MCG reconfiguration information includes one or more of: primary cell frequency information; primary cell band information; or primary cell resource configuration information.

According to some embodiments, the processing element is further configured to cause the wireless device to: initiate a MCG recovery timer based at least in part on determining that link failure for the first wireless link has occurred; stop performing MCG link failure recovery using the second wireless link if MCG link failure recovery has not yet succeeded when the MCG recovery timer expires.

According to some embodiments, the processing element is further configured to cause the wireless device to: determine that link failure for the second wireless link has occurred; and stop performing MCG link failure recovery using the second wireless link based at least in part on determining that link failure for the second wireless link has occurred.

According to some embodiments, the processing element is further configured to cause the wireless device to: perform data transmission with the cellular network using the second wireless link while MCG link failure is occurring.

Another set of embodiments may include a wireless device, comprising an antenna; a radio coupled to the antenna; and a processing element coupled to the radio; wherein the wireless device is configured to: establish a first wireless link to a cellular network via a first cell group, wherein the first cell group is configured as a master cell group (MCG); establish a second wireless link to the cellular network via a second cell group, wherein the second cell group is configured as a secondary cell group (SCG); determine that the wireless device is experiencing MCG link failure; and transmit MCG link failure information to the cellular network using the second wireless link.

According to some embodiments, the wireless device is further configured to: determine cause information for the MCG link failure, wherein the MCG link failure information includes the cause information for the MCG link failure.

According to some embodiments, the wireless device is further configured to: perform one or more serving cell or neighboring cell measurements based at least in part on determining that the wireless device is experiencing MCG link failure, wherein the MCG link failure information includes results of the one or more serving cell or neighboring cell measurements.

According to some embodiments, the wireless device is further configured to: initiate a MCG recovery timer based at least in part on determining that the wireless device is experiencing MCG link failure; initiate a radio resource control connection re-establishment procedure if the MCG recovery timer expires or if the wireless device also experiences SCG link failure while experiencing MCG link failure.

According to some embodiments, wherein the wireless device is further configured to: receive MCG reconfiguration information using the second wireless link, wherein the MCG reconfiguration information indicates one or more of a modified primary cell frequency or a modified resource configuration for the first wireless link.

According to some embodiments, the wireless device is further configured to: receive MCG reconfiguration information using the second wireless link, wherein the MCG reconfiguration information indicates to handover MCG for the wireless device to the second cell group.

Still another set of embodiments may include a first cellular base station, comprising: an antenna; a radio coupled to the antenna; and a processing element coupled to the radio; wherein the first cellular base station is configured to: establish a wireless link to a wireless device, wherein the cellular base station provides a secondary cell group (SCG) for the wireless device; receive an indication from the wireless device using the wireless link that the wireless device is experiencing master cell group (MCG) link failure; and provide the indication that the wireless device is experiencing MCG link failure to a second cellular base station, wherein the second cellular base station provides the MCG for the wireless device.

According to some embodiments, the first cellular base station is further configured to: receive MCG reconfiguration information for the wireless device from the second cellular base station; and provide an indication of the MCG reconfiguration information to the wireless device using the wireless link.

According to some embodiments, the indication that the wireless device is experiencing MCG link failure is received using a signaling radio bearer that is split between the MCG and the SCG, wherein the indication that the wireless device is experiencing MCG link failure is provided to the second cellular base station using the signaling radio bearer that is split between the MCG and the SCG.

According to some embodiments, the indication that the wireless device is experiencing MCG link failure is received using a signaling radio bearer that is specific to the wireless link between the wireless device and the SCG, wherein the indication that the wireless device is experiencing MCG link failure is provided to the second cellular base station using a different signaling mechanism than the signaling radio bearer that is specific to the wireless link between the wireless device and the SCG.

According to some embodiments, the first cellular base station is further configured to: receive a request from the second cellular base station to handover MCG for the wireless device to the first cellular base station; provide a confirmation to the second cellular base station to handover MCG for the wireless device to the first cellular base station; and provide MCG reconfiguration information to the wireless device using the wireless link, wherein the MCG reconfiguration information indicates to handover MCG for the wireless device to the first cellular base station.

According to some embodiments, the first cellular base station is further configured to: perform data transmission with the wireless device using the wireless link while the wireless device is experiencing MCG link failure.

Yet another exemplary embodiment may include a method, comprising: performing, by a device, any or all parts of the preceding examples.

Still another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a wireless device to:
establish a first wireless link to a cellular network via a first cell group, wherein the first cell group is configured as a master cell group (MCG);
establish a second wireless link to the cellular network via a second cell group, wherein the second cell group is configured as a secondary cell group (SCG);
determine that link failure for the first wireless link has occurred;
suspend transmission using the first wireless link;
perform MCG link failure recovery using the second wireless link based at least in part on the link failure for the first wireless link; and
if, after initiation of MCG link failure recovery using the second wireless link, link failure for the second wireless link occurs, stop performing MCG link failure recovery and initiate a RRC connection re-establishment procedure.

2. The apparatus of claim 1, wherein to perform MCG link failure recovery via the second wireless link, the processor is further configured to cause the wireless device to:
transmit MCG link failure information to the cellular network using the second wireless link and using one of a split signaling radio bearer SRB1 or SRB3;
receive MCG reconfiguration information from the cellular network using the second wireless link;
apply the MCG reconfiguration information to re-establish a MCG link;
transmit an indication that the MCG reconfiguration is complete to the cellular network; and
resume MCG transmission and reception using the MCG link.

3. The apparatus of claim 2,
wherein the MCG link failure information includes cause information for the link failure for the first wireless link.

4. The apparatus of claim 2,
wherein the MCG link failure information includes measurement information for one or more of the first cell group or one or more neighbor cells.

5. The apparatus of claim 2, wherein the MCG reconfiguration information includes one or more of:
primary cell frequency information;
primary cell band information; or
primary cell resource configuration information.

6. The apparatus of claim 1, wherein the processor is further configured to cause the wireless device to:
initiate a MCG recovery timer based at least in part on determining that link failure for the first wireless link has occurred;
stop performing MCG link failure recovery using the second wireless link and initiate a radio resource control connection re-establishment procedure if MCG link failure recovery has not yet succeeded when the MCG recovery timer expires.

7. The apparatus of claim 1, wherein the processor is further configured to cause the wireless device to:
perform data transmission with the cellular network using the second wireless link while MCG link failure is occurring.

8. A wireless device, comprising:
an antenna;
a radio coupled to the antenna; and
a processing element coupled to the radio;
wherein the wireless device is configured to:
establish a first wireless link to a cellular network via a first cell group, wherein the first cell group is configured as a master cell group (MCG);
establish a second wireless link to the cellular network via a second cell group, wherein the second cell group is configured as a secondary cell group (SCG);
determine that the wireless device is experiencing MCG link failure;
suspend transmission using the first wireless link;
perform MCG link failure recovery using the second wireless link based at least in part on the link failure for the first wireless link; and
if, after initiation of MCG link failure recovery using the second wireless link, link failure for the second wireless link occurs, stop performing MCG link failure recovery and initiate a RRC connection re-establishment procedure.

9. The wireless device of claim 8, wherein the wireless device is further configured to:
determine cause information for the MCG link failure; and
wherein said performing MCG link failure recovery comprises transmitting MCG link failure information to the cellular network using the second wireless link, wherein the MCG link failure information includes the cause information for the MCG link failure.

10. The wireless device of claim 8, wherein the wireless device is further configured to:
- perform one or more serving cell or neighboring cell measurements based at least in part on determining that the wireless device is experiencing MCG link failure, wherein the MCG link failure information includes results of the one or more serving cell or neighboring cell measurements.

11. The wireless device of claim 8, wherein the wireless device is further configured to:
- initiate a MCG recovery timer based at least in part on determining that the wireless device is experiencing MCG link failure;
- initiate a radio resource control connection re-establishment procedure if the MCG recovery timer expires or if the wireless device also experiences SCG link failure while experiencing MCG link failure.

12. The wireless device of claim 8, wherein the wireless device is further configured to:
- receive MCG reconfiguration information using the second wireless link, wherein the MCG reconfiguration information indicates one or more of a modified primary cell frequency or a modified resource configuration for the first wireless link.

13. The wireless device of claim 8, wherein the wireless device is further configured to:
- receive MCG reconfiguration information using the second wireless link, wherein the MCG reconfiguration information indicates to handover MCG for the wireless device to the second cell group.

14. The wireless device of claim 8, wherein to perform MCG link failure recovery via the second wireless link, the wireless device is configured to:
- transmit MCG link failure information to the cellular network using the second wireless link and using one of a split signaling radio bearer SRB1 or SRB3;
- receive MCG reconfiguration information from the cellular network using the second wireless link;
- apply the MCG reconfiguration information to re-establish a MCG link;
- transmit an indication that the MCG reconfiguration is complete to the cellular network; and
- resume MCG transmission and reception using the MCG link.

15. A method for operating a wireless device, comprising:
by the wireless device:
- establishing a first wireless link to a cellular network via a first cell group, wherein the first cell group is configured as a master cell group (MCG);
- establishing a second wireless link to the cellular network via a second cell group, wherein the second cell group is configured as a secondary cell group (SCG);
- determining that link failure for the first wireless link has occurred;
- suspending transmission using the first wireless link;
- performing MCG link failure recovery using the second wireless link based at least in part on the link failure for the first wireless link; and
- if, after initiation of MCG link failure recovery using the second wireless link, link failure for the second wireless link occurs, stop performing MCG link failure recovery and initiate a RRC connection re-establishment procedure.

16. The method of claim 15, wherein performing MCG link failure recovery via the second wireless link comprises:
- transmitting MCG link failure information to the cellular network using the second wireless link and using one of a split signaling radio bearer SRB1 or SRB3;
- receiving MCG reconfiguration information from the cellular network using the second wireless link;
- applying the MCG reconfiguration information to re-establish a MCG link;
- transmitting an indication that the MCG reconfiguration is complete to the cellular network; and
- resuming MCG transmission and reception using the MCG link.

17. The method of claim 16,
wherein the MCG link failure information includes cause information for the link failure for the first wireless link.

18. The method of claim 16,
wherein the MCG link failure information includes measurement information for one or more of the first cell group or one or more neighbor cells.

19. The method of claim 16, wherein the MCG reconfiguration information includes one or more of:
- primary cell frequency information;
- primary cell band information; or
- primary cell resource configuration information.

20. The method of claim 15, further comprising:
- initiating a MCG recovery timer based at least in part on determining that link failure for the first wireless link has occurred;
- stop performing MCG link failure recovery using the second wireless link and initiate a radio resource control connection re-establishment procedure if MCG link failure recovery has not yet succeeded when the MCG recovery timer expires.

* * * * *